(12) United States Patent
Covaro et al.

(10) Patent No.: US 8,706,271 B2
(45) Date of Patent: Apr. 22, 2014

(54) INTEGRATION OF COMPUTING DEVICE AND LIGHTING SYSTEM

(75) Inventors: Mark Covaro, Sonoma, CA (US); David Leonard, Danville, CA (US)

(73) Assignee: Redwood Systems, Inc., Fremont, CA (US)

( * ) Notice: Subject to any disclaimer, the term of this patent is extended or adjusted under 35 U.S.C. 154(b) by 281 days.

(21) Appl. No.: 13/028,900

(22) Filed: Feb. 16, 2011

(65) Prior Publication Data

US 2011/0202151 A1 Aug. 18, 2011

Related U.S. Application Data

(63) Continuation-in-part of application No. 13/025,389, filed on Feb. 11, 2011, and a continuation-in-part of application No. 12/708,460, filed on Feb. 18, 2010, now abandoned.

(60) Provisional application No. 61/428,453, filed on Dec. 30, 2010.

(51) Int. Cl.
*G06F 17/00* (2006.01)
*H04B 10/00* (2013.01)
*H03F 3/08* (2006.01)
*G01J 1/20* (2006.01)
*H01J 1/00* (2006.01)
*G06T 17/00* (2006.01)

(52) U.S. Cl.
USPC .............. 700/90; 250/205; 250/215; 315/149; 345/428; 398/118

(58) Field of Classification Search
USPC ............... 315/149; 345/428; 700/90; 70/90; 398/118; 250/214, 205
See application file for complete search history.

(56) References Cited

U.S. PATENT DOCUMENTS 4,236,145 A 11/1980 Schorsch
4,425,628 A * 1/1984 Bedard et al. ............ 710/8
4,565,927 A * 1/1986 Ragle ................... 250/559.22

(Continued)

FOREIGN PATENT DOCUMENTS

DE 202 08 061 U1 9/2002 ............... H04Q 9/00
DE 10 2008 056 164 A1 2/2010

(Continued)

OTHER PUBLICATIONS

Pigg et al., "Behavior Aspects of Lighting and Occupancy Sensors in Private Offices: A Case Study of a University Office Building", Tech MRKT Works, 1996, 10 pages.*

(Continued)

*Primary Examiner* — Kavita Padmanabhan
*Assistant Examiner* — Thomas Stevens
(74) *Attorney, Agent, or Firm* — Myers Bigel Sibley & Sajovec, P.A.

(57) ABSTRACT

A system may communicate between a display device and a lighting system using light generated by the display device and a light sensor in the lighting system. A computing device and a building control system may communication over a wireless link. The building control system may determine that the computing device is co-located with a fixture in the building control system based on whether communication over the wireless link between the computing device and the building control system is detected.

25 Claims, 4 Drawing Sheets

(56) References Cited

U.S. PATENT DOCUMENTS

| | | | | |
|---|---|---|---|---|
| 4,839,562 | A * | 6/1989 | Francis et al. | 315/149 |
| 5,060,124 | A * | 10/1991 | Crispin et al. | 362/147 |
| 5,061,997 | A * | 10/1991 | Rea et al. | 348/143 |
| 5,187,655 | A | 2/1993 | Post et al. | |
| 5,293,097 | A * | 3/1994 | Elwell | 315/154 |
| 5,406,173 | A * | 4/1995 | Mix et al. | 315/156 |
| 5,426,425 | A * | 6/1995 | Conrad et al. | 340/8.1 |
| 5,455,487 | A * | 10/1995 | Mix et al. | 315/150 |
| 5,498,931 | A * | 3/1996 | Bedocs | 315/158 |
| 5,598,000 | A * | 1/1997 | Popat | 250/206 |
| 5,598,042 | A * | 1/1997 | Mix et al. | 307/116 |
| 5,652,927 | A * | 7/1997 | McIntyre | 396/108 |
| 5,701,058 | A * | 12/1997 | Roth | 315/158 |
| 5,834,765 | A * | 11/1998 | Ashdown | 250/221 |
| 5,892,903 | A * | 4/1999 | Klaus | 726/25 |
| 5,946,209 | A * | 8/1999 | Eckel et al. | 700/14 |
| 5,962,992 | A * | 10/1999 | Huang et al. | 315/312 |
| 5,984,513 | A * | 11/1999 | Baldwin | 700/286 |
| 6,002,427 | A * | 12/1999 | Kipust | 348/156 |
| 6,043,477 | A * | 3/2000 | Timmermans | 250/205 |
| 6,046,550 | A | 4/2000 | Ference et al. | |
| 6,230,137 | B1 | 5/2001 | Has et al. | |
| 6,327,708 | B1 * | 12/2001 | Monsees | 725/12 |
| 6,380,928 | B1 * | 4/2002 | Todd | 345/169 |
| 6,421,525 | B1 * | 7/2002 | Prewitt | 434/350 |
| 6,548,967 | B1 * | 4/2003 | Dowling et al. | 315/318 |
| 6,601,767 | B1 * | 8/2003 | Gu et al. | 235/462.01 |
| 6,640,142 | B1 * | 10/2003 | Wong et al. | 700/28 |
| 6,795,808 | B1 * | 9/2004 | Strubbe et al. | 704/275 |
| 7,027,736 | B1 | 4/2006 | Mier-Langner et al. | |
| 7,049,976 | B2 * | 5/2006 | Hunt et al. | 340/870.02 |
| 7,054,233 | B2 * | 5/2006 | Kibiloski et al. | 368/67 |
| 7,190,126 | B1 | 3/2007 | Paton | |
| 7,236,154 | B1 * | 6/2007 | Kerr et al. | 345/102 |
| 7,307,542 | B1 | 12/2007 | Chandler et al. | |
| 7,315,036 | B2 | 1/2008 | Ford et al. | |
| 7,519,703 | B1 * | 4/2009 | Stuart et al. | 709/224 |
| 7,809,448 | B2 * | 10/2010 | Lys et al. | 700/12 |
| 7,935,934 | B2 * | 5/2011 | Komatsubara | 250/372 |
| 8,214,651 | B2 * | 7/2012 | Anemikos et al. | 713/185 |
| 8,215,541 | B2 | 7/2012 | Bucher et al. | |
| 8,280,558 | B2 * | 10/2012 | Picco | 700/295 |
| 8,319,721 | B2 * | 11/2012 | Edwards et al. | 345/102 |
| 2002/0071161 | A1 | 6/2002 | Perkins et al. | 359/154 |
| 2002/0140360 | A1 * | 10/2002 | Crenshaw | 315/149 |
| 2002/0175639 | A1 * | 11/2002 | Pitigoi-Aron | 315/307 |
| 2003/0015302 | A1 | 1/2003 | Pessina et al. | |
| 2003/0057887 | A1 | 3/2003 | Dowling et al. | |
| 2003/0107888 | A1 | 6/2003 | Devlin et al. | |
| 2003/0127998 | A1 * | 7/2003 | Notarianni et al. | 315/312 |
| 2003/0139134 | A1 * | 7/2003 | Bailey et al. | 455/3.01 |
| 2003/0193405 | A1 * | 10/2003 | Hunt et al. | 340/870.02 |
| 2003/0210167 | A1 | 11/2003 | Weng | 341/176 |
| 2003/0222587 | A1 * | 12/2003 | Dowling et al. | 315/149 |
| 2003/0227220 | A1 * | 12/2003 | Biskup et al. | 307/116 |
| 2004/0002792 | A1 | 1/2004 | Hoffknecht | 700/295 |
| 2004/0195494 | A1 * | 10/2004 | Kok et al. | 250/214 AL |
| 2005/0025480 | A1 | 2/2005 | Yeh | |
| 2005/0057484 | A1 * | 3/2005 | Diefenbaugh et al. | 345/102 |
| 2005/0097162 | A1 | 5/2005 | Budike, Jr. | 709/201 |
| 2005/0110416 | A1 * | 5/2005 | Veskovic | 315/149 |
| 2005/0113978 | A1 * | 5/2005 | Sharma et al. | 700/259 |
| 2005/0174473 | A1 * | 8/2005 | Morgan et al. | 348/370 |
| 2005/0179706 | A1 * | 8/2005 | Childers | 345/169 |
| 2005/0281030 | A1 * | 12/2005 | Leong et al. | 362/234 |
| 2006/0092407 | A1 * | 5/2006 | Tan et al. | 356/221 |
| 2006/0103549 | A1 * | 5/2006 | Hunt et al. | 340/870.02 |
| 2006/0104081 | A1 * | 5/2006 | Fraval | 362/557 |
| 2006/0146169 | A1 * | 7/2006 | Segman | 348/335 |
| 2006/0202851 | A1 | 9/2006 | Cash et al. | 340/825.69 |
| 2007/0024125 | A1 * | 2/2007 | Biskup et al. | 307/116 |
| 2007/0085157 | A1 * | 4/2007 | Fadell et al. | 257/428 |
| 2007/0108389 | A1 * | 5/2007 | Makela et al. | 250/372 |
| 2007/0273307 | A1 | 11/2007 | Westrick et al. | 315/312 |
| 2008/0088435 | A1 | 4/2008 | Cash et al. | |
| 2008/0129529 | A1 | 6/2008 | Ford et al. | |
| 2008/0165116 | A1 * | 7/2008 | Herz et al. | 345/102 |
| 2008/0183337 | A1 * | 7/2008 | Szabados | 700/296 |
| 2008/0186720 | A1 | 8/2008 | Verbrugh | |
| 2008/0215391 | A1 * | 9/2008 | Dowling et al. | 705/7 |
| 2008/0218087 | A1 | 9/2008 | Crouse et al. | |
| 2008/0258633 | A1 * | 10/2008 | Voysey | 315/159 |
| 2008/0265802 | A1 | 10/2008 | Van de Sluis et al. | |
| 2008/0277486 | A1 * | 11/2008 | Seem et al. | 236/49.3 |
| 2008/0297068 | A1 | 12/2008 | Koren et al. | |
| 2009/0023425 | A1 * | 1/2009 | Hosain et al. | 455/412.1 |
| 2009/0033460 | A1 | 2/2009 | Mack et al. | |
| 2009/0094317 | A1 | 4/2009 | Venkitaraman | |
| 2009/0167676 | A1 * | 7/2009 | Edwards et al. | 345/102 |
| 2009/0218951 | A1 | 9/2009 | Weaver | 315/154 |
| 2009/0230894 | A1 | 9/2009 | De Goederen et al. | |
| 2009/0236910 | A1 | 9/2009 | Yamada et al. | |
| 2009/0243517 | A1 * | 10/2009 | Verfuerth et al. | 315/315 |
| 2009/0267540 | A1 * | 10/2009 | Chemel et al. | 315/297 |
| 2009/0271042 | A1 * | 10/2009 | Voysey | 700/275 |
| 2009/0273433 | A1 | 11/2009 | Rigatti et al. | 340/3.5 |
| 2010/0011211 | A1 * | 1/2010 | Anemikos et al. | 713/168 |
| 2010/0088970 | A1 * | 4/2010 | Miller | 52/1 |
| 2010/0188009 | A1 | 7/2010 | Bull | |
| 2010/0207879 | A1 * | 8/2010 | Fadell et al. | 345/156 |
| 2010/0214948 | A1 | 8/2010 | Knibbe et al. | |
| 2010/0244746 | A1 | 9/2010 | Van De Sluis et al. | |
| 2010/0250481 | A1 * | 9/2010 | Tomastik | 706/52 |
| 2010/0327766 | A1 * | 12/2010 | Recker et al. | 315/291 |
| 2011/0031897 | A1 * | 2/2011 | Henig et al. | 315/297 |
| 2011/0043035 | A1 | 2/2011 | Yamada et al. | |
| 2011/0135317 | A1 | 6/2011 | Chaplin | |
| 2011/0140832 | A1 | 6/2011 | Vinkenvleugel et al. | |
| 2011/0202151 | A1 | 8/2011 | Covaro et al. | |
| 2011/0234366 | A1 | 9/2011 | Feng et al. | |
| 2011/0309769 | A1 * | 12/2011 | Kuroki et al. | 315/294 |
| 2012/0050307 | A1 * | 3/2012 | Mahowald et al. | 345/590 |
| 2012/0102235 | A1 | 4/2012 | Zueger et al. | |

FOREIGN PATENT DOCUMENTS

| | | | | |
|---|---|---|---|---|
| WO | WO 03/078894 A1 | 9/2003 | | F21V 21/15 |
| WO | WO 2006/048916 A2 | 5/2006 | | H05B 33/08 |
| WO | WO 2006/095316 A1 | 9/2006 | | H05B 37/02 |
| WO | WO 2006/099422 A2 | 9/2006 | | G08C 19/00 |
| WO | WO 2007/132382 A2 | 11/2007 | | H05B 37/02 |
| WO | WO 2009/150581 A1 | 12/2009 | | H05B 37/02 |

OTHER PUBLICATIONS

Waybackmachine Screen Shot for Redwood Systems, dated Nov. 22, 2009.*

Sailors-John, "Redwood System in Fremont Networks LEDs for a brighter future", San Jose Business Journal article, 4 pages, Sep. 22, 2010.*

U.S. Appl. No. 12/708,460, filed Feb. 18, 2010, Henig et al.

U.S. Appl. No. 13/025,389, filed Feb. 11, 2011, Henig et al.

European Search Report, dated Jun. 7, 2011, pp. 1-8, European Patent Application No. 11001319.0, European Patent Office, The Netherlands.

European Search Report, dated Jun. 7, 2011, pp. 1-7, European Patent Application No. 11001365.3, European Patent Office, The Netherlands.

Office Action, dated Dec. 20, 2011, pp. 1-28, U.S. Appl. No. 12/708,460, U.S. Patent and Trademark Office, Virginia.

Office Action, dated Jan. 28, 2013, pp. 1-37, U.S. Appl. No. 13/025,389, U.S. Patent and Trademark Office, Alexandria, Virginia, 37 Pages.

Office Action, dated Dec. 6, 2012, pp. 1-46, U.S. Appl. No. 13/028,900, U.S. Patent and Trademark Office, Alexandria, VA.

Notice of Abandonment, dated Sep. 20, 2012, pp. 1-2, U.S. Appl. No. 12/708,460, U.S. Patent and Trademark Office, Alexandria, VA.

* cited by examiner

INTEGRATION OF COMPUTING DEVICE AND LIGHTING SYSTEM

This application claims priority under 35 U.S.C. §119(e) to U.S. Provisional Application No. 61/428,453, "INTEGRATION OF DISPLAY DEVICE AND LIGHTING SYSTEM" filed Dec. 30, 2010, the entire contents of which are incorporated by reference, and is a continuation-in-part application of, and claims priority under 35 U.S.C. §120 to, U.S. patent application Ser. No. 12/708,460, "METHODS OF COMMISSIONING LIGHTING SYSTEMS" filed Feb. 18, 2010, the entire contents of which are incorporated by reference, and is a continuation-in-part application of, and claims priority under 35 U.S.C. §120 to, U.S. patent application Ser. No. 13/025,389, "COMMISSIONING LIGHTING SYSTEMS" filed Feb. 11, 2011, the entire contents of which are incorporated by reference.

BACKGROUND

1. Technical Field

This application relates to computing devices and, in particular, to integration of computing devices with lighting systems.

2. Related Art

Lighting systems may include light fixtures and photosensors. In a lighting system, one or more photosensors may detect light levels in a lighting area. The lighting system may adjust the amount of light produced by the light fixtures based on the light level detected by the photosensor. For example, the lighting system may maintain a target light level as the amount of sunlight varies over time by producing enough light from the light fixtures that the light level detected by the photosensor matches the target light level.

SUMMARY

A lighting system may be provided that includes a light fixture, a light sensor, and a control unit. The light sensor may detect a visible light signal emitted by a source emitter of a computing device, where the light sensor is associated with the light fixture. The control unit may set an output light level of the light fixture. The control unit may receive information from the computing device via the light sensor, where the information is embedded in the visible light signal emitted by the computing device. One interesting aspect is that the source emitter may include a display screen.

A computer-readable medium encoded with computer executable instructions may be provided for integrating a computing device with a building control system. The instructions may execute on the computing device. When executed, the computing device may communicate with the building control system over a wireless link from the computing device. Whether the computing device is in communication with the building control system over the wireless link may indicate whether the computing device is co-located with a fixture in the building control system. An indication of a target output level of an output of the building control system may be transmitted from the computing device to the building control system based on a determination that the computing device and the sensor are co-located.

A building control system may be provided that includes a sensor and a processor. The sensor may detect a signal emitted by a computing device. The processor may determine that the sensor and the computing device are co-located based on detection of the signal by the sensor. The processor may receive an identity of the computing device from the computing device based on the sensor and the computing device being co-located.

A method may be provided for integrating a computing device and a building control system. The building control system may determine that the computing device is co-located with a fixture in the building control system based on whether communication over a wireless link between the computing device and the building control system is detected. An indication of a target output level may be received from the computing device based on the computing device being co-located with the fixture, where the target output level is for an output of the building control system in an area in which the fixture is located.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
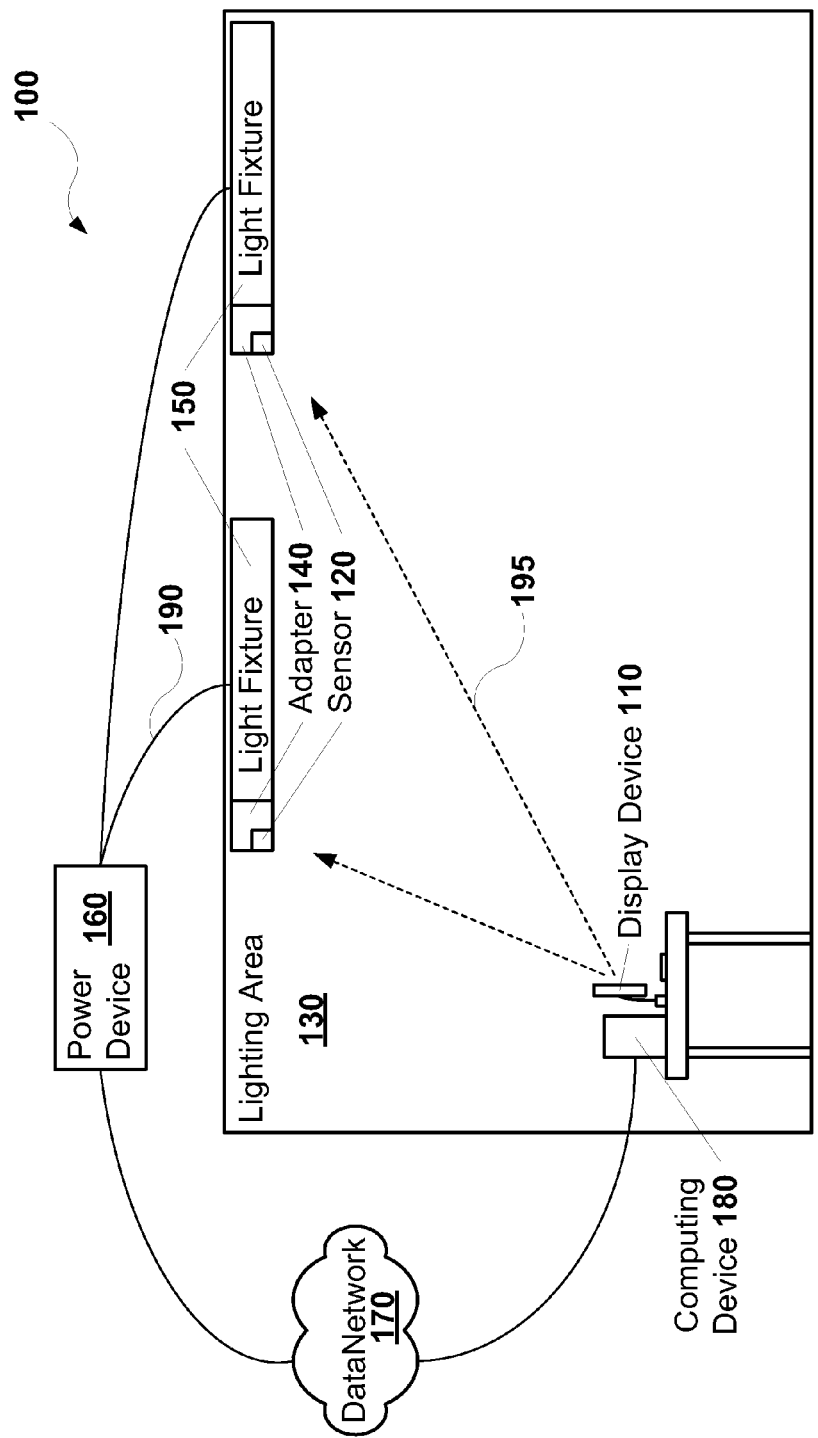
FIG. 1 illustrates an example of a system for display device communication.

An example lighting system may include one or more light fixtures and one or more sensors in a lighting area. For example, the lighting area may be a room, a workspace occupying a portion of a room, or any other space illuminated by the lighting system. The sensor may include a photosensor, a microphone, an infrared detector, or any other device that detects physical characteristics. The photosensor may detect light levels in the lighting area. Accordingly, the photosensor may generate an electrical signal that is indicative of, such as having an amplitude proportional to, the light level in the lighting area. Alternatively or in addition to detecting light levels in the lighting area, the photosensor in the lighting system may be used for communication purposes. For example, a display device, such as a computer monitor, a laptop, a cell phone, a television, or any other device that includes a display screen, may emit a light pattern that the photosensor detects. The light pattern may include, for example, light flashes at a predetermined frequency, light cycling through a set of colors, an alteration of a scan or refresh rate of the display screen, or any other suitable light sequence. The light pattern may represent data transmitted to the photosensor.

The magnitude of the light emitted by the display device may be small relative to the level of the ambient light in the lighting area. Accordingly, the lighting system may include a pattern detection circuit. The pattern detection circuit may process the electrical signal generated by the photosensor. In particular, the pattern detection circuit may separate or otherwise identify a signal pattern generated by the photosensor when the photosensor receives the light pattern.

Accordingly, data may be communicated from the display device to the lighting system. For example, the data may be a light level desired by a user of the display device. Upon receipt of the light level from the display device, a dimmer in the lighting system may adjust the amount of light generated by the light fixtures in the lighting area so that the light level in the lighting area matches the received light level.

Alternatively or in addition, the data communicated from the display device to the lighting system may be unrelated to lighting or loosely related to lighting. In one example, the data may identify a user of the display device. In a second example, the data may identify the display device or a computing device that uses the display device.

Data that is unrelated or loosely related to lighting may be useful, for example, if the lighting system includes more than just light fixtures and sensors. For example, the lighting system may include an intelligent power device. The intelligent power device may include a device that both powers and communicates with load devices, such as the light fixtures, or devices at or near the load devices. For example, the power device may convert alternating current (AC) to a direct current (DC) power signal. The power device may power light fixtures in one or more rooms with the DC power signal. The power device may also be in communication with light adapters included in, or installed near, the light fixtures. The communication may be bi-directional. The light adapters may include circuits that process signals from the sensors and communicate with the power device. For example, the light adapters may transmit sensor data to the power device. The communication with the power device may be over the same line that powers one or more of the light fixtures. The DC power signal that powers the light fixtures may also power the light adapters and sensors. The power device may include, for example, the power device described in U.S. patent application Ser. No. 12/790,038, entitled "SMART POWER DEVICE," filed May 28, 2010, the entire contents of which are hereby incorporated herein by reference.

Additionally, the power device may communicate with the display device over a data network. The data network may include, for example, a local area network (LAN), the Internet, a cellular network, or any other communications network.

A system for communicating between the display device and the photosensor may facilitate establishing a mapping or association between the display device and one or more light fixtures. Alternatively or in addition, the system may facilitate establishing a mapping between the display device, a user of the display device, or any combination thereof and the light fixtures, other load devices, the lighting area, or any combination thereof. For example, the lighting system may recognize a portable display device, such as a laptop, a netbook, a tablet computer, a cell phone, or a PDA (personal digital assistant), when the portable display device enters the lighting area. The lighting system may accordingly adjust the light level in the lighting area to match preferences of a user of the portable display device. For example, a user identifier, such as a username, may be associated with the user, and the user may be logged into the portable display device under the username. The preferences of the user (user preferences) may be associated with the username. The lighting system may apply the user preferences associated with the user to the light fixtures in the lighting area where the display device is detected.

Alternatively or in addition, the display device may be mapped into a lighting group. The lighting group may be a group of light fixtures grouped together as a unit for the purpose of controlling the light fixtures as a unit. The physical location of the lighting group may be known. Thus, when the display device is mapped to, or associated with, the lighting group, the location of the display device may be determined. Alternatively, the physical location of the light group may not be known, but the location of the display device may be known. Thus, when the display device is mapped into the lighting group, the location of the lighting group may be determined. Alternatively or in addition, the lighting system may initially form the lighting group based on which photosensors receive the light pattern from the display device.

Alternatively or in addition, the power device may determine which of the photosensors is nearest to the display device. For example, the light adapters may transmit the signal level received from the photosensors to the power device. The power device may compare the signal levels and determine that the power device is closest to the photosensor that generated the highest signal level. Thus, the power device may be able to track the physical location of the display device. Accordingly, the power device may be able to track the physical location of a user of the display device.

The display device may emit light patterns that are not noticeable to the user. For example, the duration of the pulses of light flashes emitted by the display device may be fast and/or short enough that a human may not perceive the light flashes.

The light patterns may be sent at any suitable time. For example, the display device may transmit the light patterns when the display device is powered on, when a computing device that uses the display device is powered on, when a lid of a laptop is opened, in a screen saver application 365, in response to user input received from a user interface, or at any other suitable time.

FIG. 1 illustrates an example of a system 100 for display device communication. The display device communication may be between a display device 110 and at least one photosensor 120 in a lighting area 130. The system 100 may include the display device 110 and the photosensor 120. The system 100 may include more, fewer, or different elements. For example, the system 100 may include a dimmer (not shown) that adjusts the light level in the lighting area 130 to match a requested light level received from the display device via the photosensor 120. Alternatively or in addition, the system 100 may include at least one light adapter 140, at least one light fixture 150, and a power device 160. Alternatively or in addition, the system 100 may include a data network 170. In addition, the system 100 may include multiple photosensors, multiple power devices, multiple light fixtures, multiple display devices, and multiple data networks. For example, the system may be used in multiple lighting areas. Alternatively or in addition, the system 100 may include server computers, databases, and any other component suitable for implementing the features of the system 100.

The display device 110 may include any device or combination of devices that includes a display screen that emits light. Examples of the display device 110 include a computer monitor, a laptop, a netbook, a tablet computer, a cell phone, a PDA (personal digital assistant), an LED (light emitting diode) screen, an LCD (liquid crystal diode) screen, a plasma screen, a television, a CRT (cathode ray tube), or any other suitable device that includes a display screen. References to the term "display device" may additionally refer to a computing device 180 that causes the display device 110 to emit light. Examples of the computing device 180 include a personal computer, a server computer, a tablet computer, a cell phone, and any other device that includes a processor. The display device 110 may be located in the lighting area 130. Alternatively or in addition, the display device 110 may be moved in and out of the lighting area 130. The display device 110 may or may not be portable.

The photosensor 120 may be any electrical component or combination of electrical components that detects light. The detected light may or may not be in the visible spectrum. Examples of the photosensor 120 include, but are not limited to, an optical detector, a chemical detector, a photoresistor or LDR (light dependent resistor), a photovoltaic cell or solar cell, a photodiode, a photomultiplier tube, a phototransistor, a LED (light emitting diode) reverse-biased to act as a photodiode, an infrared detector, or any other light-sensing device. The photosensor may be located anywhere in or near the lighting area 130. In one example, the photosensor 120 may be included in the light fixture 150. In a second example, the photosensor 120 may be positioned adjacent to or near the light fixture 150. In a third example, the photosensor 120 may be coupled to a ceiling, a floor, a wall, or some other surface of a building or physical structure where light in the lighting area 130 may be detected. When coupled to a surface, the photosensor 120 may be embedded below the surface, installed partially below the surface, positioned on the surface, located in a housing, or be positioned in any other suitable configuration with respect to the surface so that the photosensor 120 may receive light present in the lighting area 130.

The lighting area 130 may include any physical space that may be illuminated by one or more of the light fixtures 150. The lighting area 130 may include an area outside of a building, an area inside of a building, a room, a portion of the room, a workspace, any other area that may be lit by at least one of the light fixtures 150, or any combination thereof.

The light adapter 140 may include any circuit or combination of circuits that processes signals from the photosensor 120 or other sensor and communicates with the power device 160. The light adapter 140 may communicate with the power device 160 using any communication mechanism now known or later discovered. For example, the light adapter 140 may communicate with the power device 160 using TCP/IP (transmission control protocol/Internet protocol) or any other data communication protocol. As explained in more detail below, the light adapter 140 may communicate with the power device 160 over a line 190 that supplies power to the light fixture 150. Alternatively or in addition, the light adapter 140 may communicate wirelessly or over a communication line different from the line 190 that supplies power to the light fixture 150. In other words, the light adapter 140 may communicate with the power device 160 using an overlay network. The light adapter 140, in addition to the light fixture 150, may be powered by a DC power signal sent over the line 190. In a second example, the light adapter 140 may be powered by a local power source, such as a battery, a solar cell, or an AC/DC adapter. In a third example, the light adapter 140 may be powered by the power device 160 over a different line than the line 190 that the delivers power to the light fixture 150. The light adapter 140 may be positioned anywhere inside of the lighting area 130 or anywhere outside of the light lighting area as long as the light adapter 140 may receive signals from the photosensor 120. The light adapter 140 may be included in the light fixture 150. Alternatively or in addition, the light adapter 140 may be separate from the light fixture 150.

The light fixture 150 may be any electrical device or combination of devices that creates artificial light from electricity. The light fixture 150 may distribute, filter or transform the light from one or more lamps included or installed in the light fixture 150. Alternatively or in addition, the light fixture 150 may include one or more lamps. The lamps may include incandescent bulbs, LED lights, fluorescent tubes, any other device now known or later discovered that generates artificial light, or any combination thereof. The light fixture 150 may be located anywhere in or near the lighting area 130. The light fixture 150 may be coupled to a ceiling, a floor, a wall, or some other surface of a building or physical structure from which the light fixture 150 may project light into the lighting area 130. When coupled to a surface, the light fixture 150 may be embedded below the surface, installed partially below the surface, positioned on the surface, located in a housing, or be positioned in any other suitable configuration with respect to the surface so that the light fixture 150 may transmit light into the lighting area 130. The light fixture 150 may be affixed to the surface or be adjacent to the surface. Examples of the light fixture 150 include a compact fluorescent light, a task/wall bracket fixture, a linear fluorescent high-bay, a spot light, a recessed louver light, a desk lamp, or any other device that includes one or more lamps.

The power device 160 may be any device or combination of devices that supplies power to one or more light fixtures 150 and that communicates with the light adapters 140. As explained in more detail below, the power device 160 may provide power to, and communicate with, the light adapter 140 over the line 190.

In one example, the power device 160 may communicate over the data network 170. The data network 170 may be a local area network (LAN), a wireless local area network (WLAN), a personal area network (PAN), a wide area network (WAN), the Internet, a cellular network, any other now known or later developed communications network, or any combination thereof.

The line 190 may be any suitable tangible medium that can propagate an electromagnetic signal. For example, the line 190 may include twisted pair wiring, Ethernet wiring, 10 AWG (American wire gauge) building wiring, or any other type of wiring comprising at least two conductors or a loop. Twisted pair wiring is a form of wiring in which two conductors are wound together for the purposes of canceling out electromagnetic interference (EMI) from external sources and crosstalk between neighboring pairs. The two conductors may represent a line. Twisted pair wiring is the primary wire type for telephone usage. Ethernet wiring typically includes four or more lines of twisted pair wiring.

During operation of the system 100, the display device 110 may emit a light pattern 195 that one or more photosensors 120 detect. The light pattern 195 may include, for example, light flashes at a predetermined frequency, light cycling through a set of colors, an alteration of a scan or refresh rate of the display screen, or any other suitable light sequence.

The display device 110 may transmit data to one or more light adapters 140 via one or more photosensors 120 by emitting the light pattern 195. The data may be encoded in the light pattern 195. The light pattern 195 may comprise a particular sequence of color flashes. The frequency at which the display device 110 cycles through the color flashes may convey information if the data is frequency modulated. For example, an RGB sensor coupled to the light adapter 140 may detect the particular sequence of color flashes and determine the frequency at which the display device 110 cycled through the flashes. The frequency may correspond to a particular target light level. For example, at frequency $f_1$, the target light level may correspond to zero. At frequency $f_2$, the target light level may correspond to maximum light level. At some frequency between $f_1$ and $f_2$, the target light level may correspond to a value between zero and maximum light level.

Alternatively or in addition, the light pattern 195 may comprise a sequence of flashes of varying intensity. The photosensor 120 may be unable to detect different colors, but still be able to detect the flashes of varying intensity. The display device 110 may vary the frequency at which the display device 110 cycles through the flashes of varying intensity. Alternatively or in addition, the display device 110 may vary the frequency at which the display device 110 re-transmits the light pattern 195, while keeping constant the frequency at which the flashes within the light pattern 195 are transmitted. Alternatively or in addition, the display device 110 may vary both frequencies. Thus, as described above, the display device 110 may frequency modulate the transmission of the light patterns in order to transmit data to the light adapter 140. Alternatively or in addition, the display device 110 may amplitude modulate the light patterns.

Alternatively or in addition, the communication may be digital. For example, the display device 110 may transmit the light pattern 195 at frequency $f_1$ in order to transmit a first binary value to the display device 110. The display device 110 may transmit the light pattern 195 at frequency $f_2$ in order to transmit a second binary value to the display device 110. By altering the frequency at which the light pattern 195 is transmitted from between $f_1$ and $f_2$, respectively, the display device 110 may transmit any data represented as binary values.

Alternatively or in addition, the display device 110 may alternate between two light patterns 195, where one of the two light patterns 195 corresponds to a first binary value and a second one of the two light patterns 195 corresponds to a second binary value. The light adapter 140 may correlate the light pattern 195 received to the first or second binary value depending on the received light pattern 195. Any other mechanism of encoding data into the light pattern 195 may be used.

Any mechanism for encoding data may be used for the communication between the display device 110 and the light adapter 140. Examples of encoding mechanisms may include frequency modulation, amplitude modulation, pulse-width modulation, frequency-shift keying, or any other manner of transmitting data.

The light sequence 195 may be predetermined. Alternatively or in addition, the light sequence 195 may be determined or negotiated.

The communication between the display device 110 and the light adapter 140 may be uni-directional or bi-directional. In some configurations, the light fixture 150 or other light source controlled by the lighting system may generate light encoded with data that is received by a photosensor and/or camera included in or coupled to the display device 110.

Figure 2:
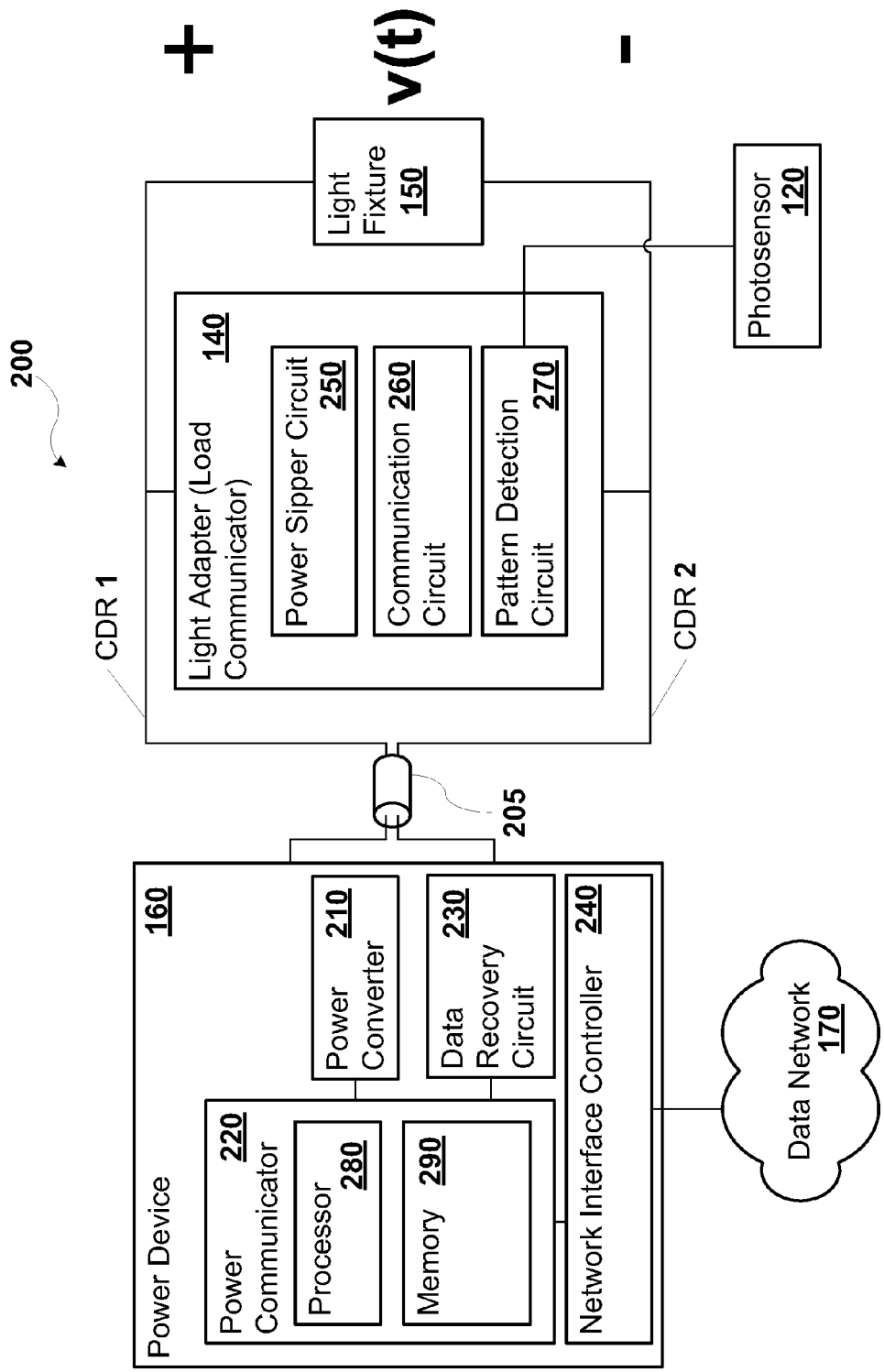
FIG. 2 illustrates a hardware diagram of an example of a lighting system that includes an intelligent power device.

FIG. 2 illustrates a hardware diagram of an example of a lighting system 200 that includes the intelligent power device 160. The intelligent power device 160 may both power the light fixture 150 and communicate with the light adapter 140 over a single line 205, such as the line 190 illustrated in FIG. 1. In addition to powering the light fixture 150, the intelligent power device 160 may power the light adapter 140 over the single line 205. The single line 205 includes two conductors, CDR 1 and CDR 2. The line 205 may be any suitable tangible medium that can propagate an electromagnetic signal. For example, the line 190 may be twisted pair wiring, Ethernet wiring, 10 AWG (American wire gauge) building wiring, or any other type of wiring comprising at least two conductors, or a loop. The length of the line 205 may be any suitable length.

The lighting system 200 may include the light fixture 150, the light adapter 140, the photosensor 120, and the power device 160. The lighting system 200 may include additional, fewer, or different components. For example, the lighting system 200 may include only the light fixture 150, the photosensor 120, and a dimmer control (not shown), which is electrically coupled to both the light fixture 150 and the photosensor 120.

In the example illustrated in FIG. 2, the light fixture 150 is a load device because the light fixture 150 draws power from the power device 160. The light adapter 140 is a load communicator because the light adapter 140 communicates with the power device 160 from the load device or from nearby the load device. Any suitable device may be the load device instead of, or in addition to, the light fixture 150. For example, the light fixture 150 may be a first load device and the light adapter 140 may be a second load device, such as is illustrated in FIG. 2. The communication between the power device 160 and the light adapter 140 may be unidirectional or bi-directional.

The power device 160 may be any device or combination of devices that provides power over the two conductors, CDR 1 and CDR 2, and that communicates over the same two conductors. The power device 160 may provide power to the load device over the conductors, CDR 1 and CDR 2, as a DC (direct current) signal. Alternatively or in addition, the power device 160 may provide power to, and communicate over, additional conductors.

The power device 160 may control the amount of power delivered by the DC signal through pulse-width modulation (PWM) of the signal, through amplitude modulation of the signal, or a combination thereof. PWM of the signal may include varying the duty cycle of the signal in order to vary the amount of power delivered. The duty cycle is the fraction of time that the signal is in an "active" state, which, for a periodic function, may be represented as:

$$\text{duty cycle } D = \tau/T$$

where $\tau$ is the duration that the function is non-zero and $T$ is the period of the function. Alternatively or additionally, the power device 160 may vary the amplitude of the pulse-width modulated signal in order to change the average amount of power delivered to the load device while maintaining a constant duty cycle.

The power device 160 may generate any type of pulse-width modulated signal, such as a pulse wave, a square wave, or a rectangular wave. The signal may be considered in an "active" state when the voltage or the current of the signal exceeds a determined threshold. In one example, such as a rectangular wave, pulse-width modulation may be provided where the duty cycle is different than ½ or 0.5.

The power device 160 may transmit data to the load device using frequency modulation of the pulse-width modulated signal while maintaining a constant duty cycle in order to continue to deliver a desired average amount of power to the load device. For example, the power device 160 may generate n alternate waveforms, where each one of the wave forms has the same duty cycle, but each one of the wave forms has different frequencies. Each one of the alternate waveforms may represent one of n possible states to transmit over the line. Alternatively, different methods of transmitting data may be used.

The power device 160 may include a power converter 210, a power communicator 220, a data recovery circuit 230, and a network interface controller 240. The power device 160 may include additional, fewer, or different components. For example, the power device 160 may not include the network interface controller 240.

The power converter 210 may include any circuit that generates the DC signal over the two conductors, CDR 1 and CDR 2, in order to power the load device. Examples of the power converter 210 include a switched-mode power supply, an AC to DC (Alternating Current to Direct Current) converter, a DC to DC (Direct Current to Direct Current) converter, a fixed-frequency PWM converter, a variable-frequency quasi-resonant ZCS/ZVS (zero-current switching/zero-voltage switching) converter, a voltage converter, a current converter, a hysteretic converter, a PWM buck converter, and any other suitable power source.

The power communicator 220 may be any circuit, device, or combination of devices that controls the DC signal generated by the power converter 210 in order to transmit data over the line 205. Alternatively or in addition, the power communicator 220 may be any circuit, device, or combination of devices that receives data from the line 205. The power communicator 220 may receive the data from the line 205 through the data recovery circuit 230. The power communicator 220 may additionally communicate over the data network 170 via the network interface controller 240. In one example, the power communicator 220 may additionally control the DC signal generated by the power converter 210 in order to control the amount of power delivered to the load device.

The power communicator 220 may include a processor 280 and a memory 290. The processor 280 may be in communication with the memory 290. The processor 280 may be in communication with other components, such as the power converter 210, the data recovery circuit 230, and the network interface controller 240.

The memory 290 may be any now known, or later discovered, data storage device, component or combination thereof. The memory 290 may include non-volatile and/or volatile memory, such as a random access memory (RAM), a read-only memory (ROM), an erasable programmable read-only memory (EPROM), flash memory, or any other type of electronic storage component. Alternatively or in addition, the memory 290 may include an optical, magnetic (hard-drive) or any other form of data storage device.

The processor 280 may be a general processor, central processing unit, server, application specific integrated circuit (ASIC), digital signal processor, field programmable gate array (FPGA), digital circuit, analog circuit, or combinations thereof. The processor 280 may be operable to execute computer executable instructions or computer code embodied in the memory 290 or in other memory to implement the functionality of the power communicator 220. The computer code may include instructions executable with the processor 280. The computer code may be written in any computer language now known or later discovered, such as C++, C#, Java, Pascal, Visual Basic, Perl, HyperText Markup Language (HTML), JavaScript, assembly language, and any combination thereof. In one example, the memory 290 may include an operating system, such as LINUX®, a registered trademark of individual, William Croce of Boston, Mass.

The network interface controller (NIC) 240 may include hardware or a combination of hardware and software that enables communication over the data network 170. The NIC may 240 may provide physical access to a network and provide a low-level addressing system through use of Media Access Control (MAC) addresses. The NIC 240 may include a network card that is installed inside a computer or other device. Alternatively, the NIC 240 may include an embedded component as part of a circuit board, a computer mother board, a router, an expansion card, a printer interface, a USB (universal serial bus) device, or as part of any other hardware.

The data recovery circuit 230 may be any circuit that facilitates extracting data received from the line 205. The data recovery circuit 230 may recover all or a portion of a data signal transmitted from the light adapter 140 over the line 205.

The light adapter 140 may be any circuit, device, or combination of devices that transmits and receives data over the line 205. Alternatively or in addition, the light adapter 140 may receive data directly or indirectly from the photosensor 120. For example, the light adapter 140 may receive a light level signal from the photosensor 120, where the light level signal indicates the light level measured by the photosensor 120. The light adapter 140 may transmit data, such as the measured light level, to the power device 160. The light adapter 140 may include a power sipper circuit 250, a communication circuit 260, and a pattern detection circuit 270. The light adapter 140 may include additional, fewer, or different components. For example, the light adapter 140 may not include the pattern detection circuit 270 or the power sipper circuit 250.

The power sipper circuit 250 may be any circuit configured to store power received on the line 205 so as to provide regulated DC power to the communication circuit 260, the pattern detection circuit 270, the photosensor 120, any other suitable device, or any combination thereof. The power sipper circuit 250 may include, for example, a linear regulator or a switching regulator.

The communication circuit 260 may be any circuit that sends and receives information over the line 205. The communication circuit 260 may include a processor and a memory, such as the processor 280 and the memory 290 included in the power communicator 220, but where the processor executes computer instructions or computer code embodied in the memory to implement the functionality of the communication circuit 260.

The pattern detection circuit 270 may process an electrical signal generated by the photosensor 120. In particular, the pattern detection circuit 270 may separate or otherwise identify a signal pattern generated by the photosensor 120 when the photosensor receives the light pattern 195.

During operation of the lighting system 200 and/or the system 100 for display device communication, the photosensor 120 may detect light in the lighting area 130. The pattern detection circuit 270 may process one or more signals from the photosensor 120 in order to isolate the signal pattern generated when the photosensor receives the light pattern 195. The pattern detection circuit 270 may provide the signal pattern, or data extracted from the signal pattern, to the communication circuit 260. The communication circuit 260 may further process the signal pattern to extract the data if the pattern detection circuit 270 did not already do so. Alternatively, the communication circuit 260 may provide the signal pattern to the power device 160 to extract the data.

The communication circuit 260 may transmit the data to the power device 160 using any number of possible communication techniques. In one example, the communication circuit 260 may alter the impedance between the two conductors, CDR 1 and CDR 2. To do so, the communication circuit 260 may connect or disconnect a component between the conductors, CDR 1 and CDR 2, thereby altering the impedance on line 205. The data recovery circuit 230 of the power device 160 may detect the altered impedance by detecting a change in an operating frequency of the power converter 210, if the power converter 210 includes a hysteretic controller. The operating frequency is the frequency of a signal internal to the power converter 210 that is filtered to produce the DC signal on the line 205 when DC signal is active. For example, the signal internal to the power converter 210 may be filtered with a filter comprising an inductor and a capacitor. The communication between the power device 160 and the communication circuit 260 may be the same as the communication between a control device and a communication circuit described in U.S. patent application Ser. No. 12/389,868, entitled "TRANSMISSION OF POWER AND DATA WITH FREQUENCY MODULATION," filed Feb. 20, 2009, the entire contents of which are hereby incorporated herein by reference. Thus, the communication circuit 260 may transmit data to the power device 160 by altering the impedance on the line 205.

In a second example, the communication circuit 260 may alter the resistance in the electrical path between the two conductors, CDR 1 and CDR 2, by connecting or disconnecting a component between the conductors. If the power converter 210 is a current source, altering the resistance results in a change in the voltage, v(t), on the line 205. The data recovery circuit 230, may detect changes in the voltage, v(t), on the line 205, by comparing the line voltage, v(t), to a reference voltage. If the voltage, v(t), on the line 205 is above the reference voltage, then the data recovery circuit 230 may determine that the communication circuit 260 in the light adapter 140 has increased the resistance on the line 205. The communication between the power device 160 and the light adapter 140 may be the same as the communication between a control system and a load communicator described in U.S. patent application Ser. No. 12/536,231, entitled "DIGITAL SWITCH COMMUNICATION," filed Aug. 5, 2009, the entire contents of which are hereby incorporated herein by reference. Thus, the communication circuit 260 may transmit data to the power device 160 by switching a resistive element in and out of the electrical path between the two conductors, CDR 1 and CDR 2.

In a third example, the communication circuit 260 may short the two conductors, CDR 1 and CDR 2, during a discharge cycle of the DC power signal on the line 205 if the light fixture 150 includes a LED or any other diode that has a diode forward voltage drop, $V_d$. Each period of the power signal may include a charge cycle and a discharge cycle. During the charge cycle, the power device 160 is active and charges the line 205. During the discharge cycle, the power device 160 is inactive, and does not charge or discharge the line. If the voltage, v(t), on the line 205 when the discharge cycle begins is greater than the total diode forward voltage drop, $V_d$, of the LED, then the voltage, v(t), on the line 205 almost immediately drops to $V_d$. During the rest of the discharge cycle, the voltage on the line 205 decreases at a rate determined by parasitic electrical losses in the power device 160, the line 205, the light adapter 140, and the light fixture 150. If the voltage on the line 205 when the discharge cycle begins is less than or equal to the total diode forward voltage drop, $V_d$, then the voltage on the line 205 may simply decrease at a rate determined by parasitic electrical losses during the discharge cycle. Consequently, the line 205 may not fully discharge before the next charge cycle begins. However, if the communication circuit 260 shorts the two conductors, CDR 1 and CDR 2, during the discharge cycle, then the voltage, v(t), on the line 205 may drop suddenly to zero. The data recovery circuit 230 in the power device 160 may compare the voltage, v(t), on the line 205 with a calibrated reference voltage at a particular point in time during the discharge cycle. If the voltage on the line 205 is below the calibrated reference voltage, then the data recovery circuit 230 may detect the communication circuit 260 shorting the line 205. Alternatively, if the voltage on the line 205, is above the calibrated reference voltage, then the data recovery circuit 230 may determine that the communication circuit 260 did not short the line 205. The communication between the power device 160 and the light adapter 140 may be the same as the communication between a power device and a load communicator described in U.S. patent application Ser. No. 12/465,800, entitled "DISCHARGE CYCLE COMMUNICATION," filed May 14, 2009, the entire contents of which are hereby incorporated herein by reference. Thus, the communication circuit 260 may transmit data to the power device 160 by shorting the two conductors, CDR 1 and CDR 2 during the discharge cycle if the light fixture 150 includes a LED or any other diode that has a diode forward voltage drop, $V_d$.

As described above, the communication circuit 260 may transmit data to the power device 160 using any number of possible communication techniques. As also described above, the power device 160 may transmit data to the communication circuit 260 using frequency modulation of the pulse-width modulated signal. In one example, the power device 160 and the communication circuit 260 may include a communication protocol module executable with a processor, such as the processor 280 in the power device 160. The communication protocol module may implement the logic of any communication procotol now known or later discovered. The communication protocol module may be layered above, and transmit and receive data using, any of the suitable techniques described above. Accordingly, executable instructions stored in the memory 290 of the power device 160 and in the light adapter 140 may communicate with each other by invoking programmatic functions implemented in the communication protocol modules. Examples of the communication protocol include TCPIP (transport control protocol/Internet Protocol), RS-232 (Recommended Standard 232), USB (Universal Serial Bus) or any other type of communication protocol.

In one example, the communication protocol may be a simple protocol that facilitates transmission and receipt of symbols. Each symbol may be represented by a fixed number of bits, such as 8 or 16 bits. An escape sequence may be a predefined sequence of symbols. In one embodiment, a notice of a hardware interrupt generated at the light adapter 140 may be communicated to the power device 160 by transmitting a particular escape sequence that corresponds to the hardware interrupt from the light adapter 140. The power device 160 may detect the particular escape sequence in a stream of symbols received from the light adapter 140 and, accordingly, handle the interrupt. The power device 160 may, for example, transmit an acknowledgement escape sequence to the light adapter 140 and, accordingly, handle the interrupt. The power device 160 may, for example, transmit an acknowledgement escape sequence to the light adapter 140 to indicate that the interrupt is handled.

Figure 3:
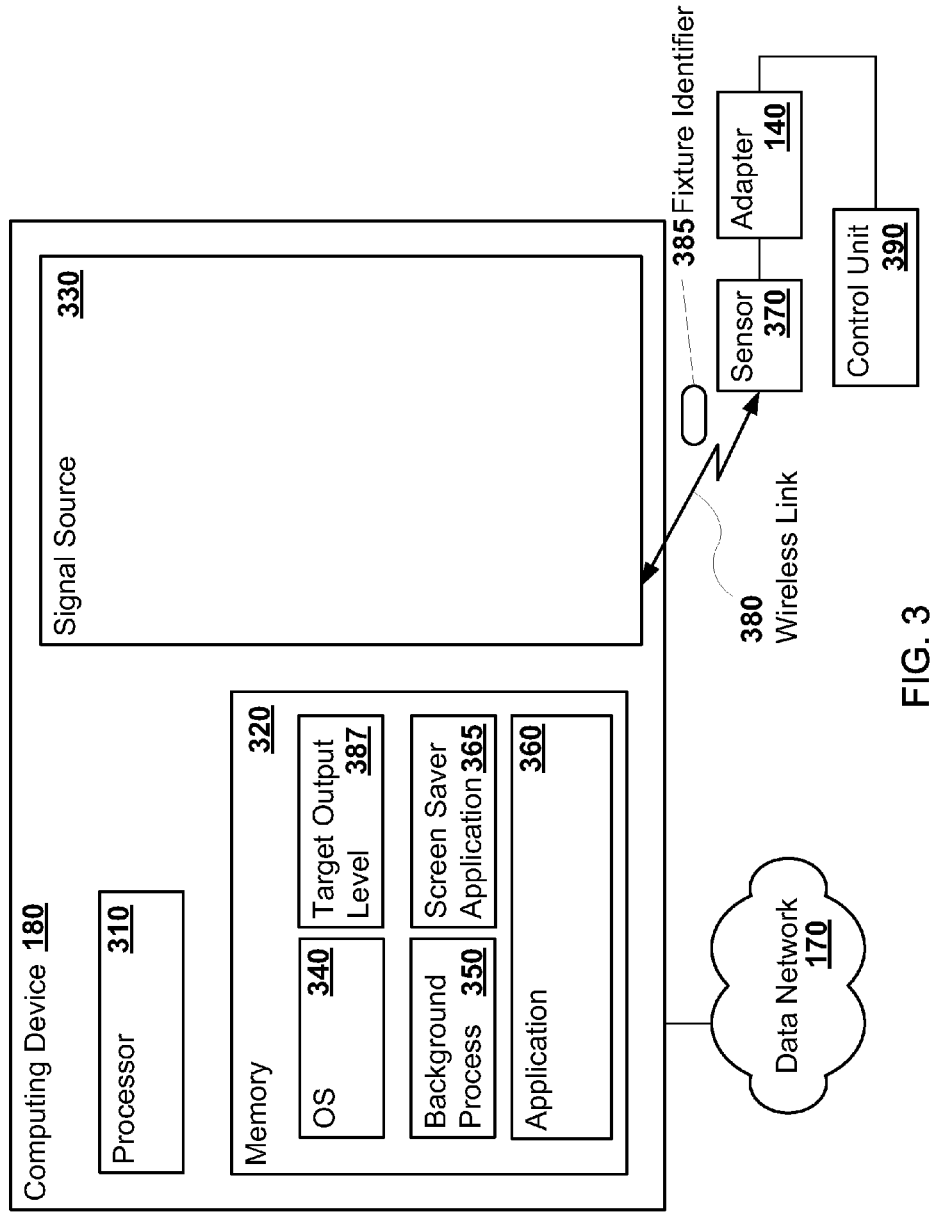
FIG. 3 illustrates a hardware diagram of an example of a computing device.

FIG. 3 illustrates a hardware diagram of an example of the computing device 180. The computing device 180 may include a processor 310, a memory 320, and a signal source 330. The computing device 180 may include additional, fewer, or different components. For example, the computing device 180 may include a sensor in addition to, or instead of, the signal source 330.

The signal source 330, or source emitter, may include any device that transmits a signal that may be received by a sensor 370 in the lighting system, such as the photosensor 120 in FIG. 1. Examples of the signal source 330 include a display screen, an LED, a radio frequency antenna; an infrared, an ultraviolet, or a visible light source; and a speaker, an ultrasonic emitter or other sound generator. Thus, in one or more examples, the computing device 180 may include the display device 110, where the signal source 330 includes the display screen.

The processor 310 may be operable to execute computer executable instructions or computer code embodied in the memory 320 or in other memory to implement the features of the computing device 180. Examples of the processor 310 may include a general processor, central processing unit, server, application specific integrated circuit (ASIC), digital signal processor, field programmable gate array (FPGA), digital circuit, analog circuit, or combinations thereof.

The memory 320 may include a non-volatile and/or volatile memory, such as a random access memory (RAM), a read-only memory (ROM), an erasable programmable read-only memory (EPROM), flash memory, any other type of memory now known or later discovered, or any combination thereof. The memory 320 may include an optical, magnetic (hard-drive) or any other form of data storage device.

The memory 320 may include an application 360, a background process 350, and an operating system 340. The memory 320 may include additional, fewer, or different components. The application 360 may be an app in a cell phone, for example. In a different example, the application 360 may be an application running on a desktop computer. The background process 350 may execute concurrently with one or more applications and monitor the activity of a user interacting with the computing device 180. For example, the background process 350 may detect when a lid to a laptop is opened or closed. The operating system 340 may be a multitasking operating system.

In one example, the application 360 and/or the background process 350 may communicate with power device 160 to set the target light level of the light fixtures 150 that illuminate the lighting area 130. In another example, the application 360 and/or the background process 350 may provide the power device 160 with information about user activity at the computing device 180. For example, information about the activity at the computing device 180 may include whether a user is logged in, an identification of a user logged into the operating system, the length of time that has elapsed since the processor has received any user input, or any other information. The power device 160 may, for example, determine occupancy based on the information about the user activity received from the computing device 180, where the occupancy is an indication of whether one or more people are in an area in which the power device 160 is located.

The systems 100 and 200 may be implemented in many different configurations. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

In some configurations, the systems 100 and 200 may determine that the computing device 180 and the light fixture 150 are co-located based on communication over a wireless link 380 between the computing device 180 and the sensor 370 in the lighting system that includes the light fixture 150. The wireless link 380, or wireless communications link, may comprise light-based communication between the computing device 180 and the light adapter 140 via the sensor 330, where the signal source 330 of the computing device 180 emits visible light signals. Alternatively, the wireless link 380 may comprise any other distance-limited communication. For example, the wireless link 380 may comprise sound-based communication between the signal source 330 and the sensor 370. For example, the signal source 330 may include one or more speakers and the sensor 370 may include a microphone electrically coupled to the light adapter 140. Alternatively or in addition, the sound-based communication may be between speakers coupled to the light adapter 140 and a microphone included in or coupled to the computing device 180. In another example, the wireless link 380 may comprise radio-based communication, such as WI-FI™ and/or Bluetooth™ compliant communication. In yet another example, the wireless link 380 may comprise ultrasound-based communication. In some configurations, the lighting system may include one or more ultrasound motion detectors, which may be leveraged to implement the ultrasound-based communication. Due to the nature of distance-limited communication in the wireless link 380, co-location may be deduced when two devices, such as the computing device 180 and the sensor 370, successfully communicate over the wireless link 380.

Whether the computing device 180 communicates with the lighting system over the wireless link 380 may indicate whether the computing device is co-located with the light fixture 150. Accordingly, two devices may be co-located when the two devices are near enough that the distance-limited communication over the wireless link 380 between the two devices occurs. Alternatively or in addition, two devices may be co-located when the two devices are physically located in the same room. Alternatively or in addition, the computing device 180 may be co-located with the light fixture 150 if the computing device 180 is in the lighting area 130 of the light fixture 150. More generally, the computing device 180 may be co-located with a fixture, if the fixture controls or generates an output in a physical area in which the computing device 180 is located.

The communication over the wireless link 380 may be unidirectional from the computing device 180 to the sensor 370 in the lighting system. Alternatively, the communication over the wireless link 380 may be unidirectional from a signal source included in the lighting system to a sensor included in the computing device 180. Alternatively, the communication over the wireless link 380 may be bi-directional. Thus, when the computing device 180 communicates with the lighting system over the wireless link 380, the computing device 180 may receive data from the lighting system, transmit data to the lighting system, or, in one or more examples, both transmit and receive data.

Communication between the computing device 180 and the power device 160 or any other component of the lighting system may be over the wireless link 380, over the data network 170, or any combination thereof. For example, communication over the wireless link 380 may establish that the computing device 180 is co-located with the sensor 370 and/or the light fixture 150 associated with the sensor 370, and communication over the data network 170 may be for exchange of other type of information.

In one example, the power device 160, the computing device 180, and/or some other device on the data network 170 may associate an identity of the computing device 180 with the light fixture 150 based on a determination that the computing device 180 is co-located with the light fixture 150. In one example, the power device 160 may transmit the identity of the computing device 180 to the power device 160, which associates the identity of the computing device 180 with an identity of the light fixture 150 in the memory 290 of the power device 160. In a second example, the power device 160 may transmit the identity of the co-located light fixture or light fixtures 150 to the computing device 180, which stores the received identity of the co-located light fixture or light fixtures 150 in the memory 320 of the computing device 180.

Alternatively or in addition, the power device 160, the computing device 180, and/or some other device on the data network 170 may associate an identity of a user of the computing device 180 with the light fixture 150 based on the determination that the computing device 180 is co-located with the sensor 370 or the light fixture 150. Examples of the identity of the computing device 180 may include a network address, such as a MAC address, an IP address, or a network name, a username, or any other unique identifier. The network address may, for example, identify the computing device 180 on the data network 170.

As described above, the power device 160 may communicate with the computing device 180 and/or vice versa over the wireless link 380. Accordingly, the power device 160 and/or the computing device 180 may determine that the computing device 180 is co-located with one or more light fixtures 150. The power device 160 and/or the computing device 180 may communicate over one or more communications links other than the wireless link. For example, the power device 160 and the computing device 180 may communicate with each other over the data network 170.

In some configurations, the power device 160 or some other device on the data network 170 may determine a target light level for the lighting area 130 based on information received from the computing device 180 over the data network 170 or the wireless link 380. The communication over the wireless link 380 may establish that the computing device 180 is in or near the lighting area 130. The power device 160 may set an output light level or power level to one or more of the light fixtures 150 co-located with the computing device 180. In particular, the power device 160 may adjust the power supplied to the light fixtures 150 co-located with the computing device 180 so that the light level in the lighting area 130 matches the target light level.

In one example, the power device 160 may maintain an identity table or other data structure in the memory 290 of the power device 160. The identity table may identify groups of the light fixtures 150 and user identifiers. Table 1 below provides an example of the identity table.

TABLE 1

| Username | Group 1 | Group 2 | Group 3 | ... |
|---|---|---|---|---|
| User1 | Light (1, 1) | Light (1, 2) | Light (1, 2) | ... |
| User2 | Light (2, 1) | . | . | |
| User3 | Light (3, 1) | . | . | |
| . | | | | |
| . | | | | |
| . | | | | |

The user identifiers may include usernames, for example. Each of the groups of the light fixtures 150 may correspond to a physical location, such as room, or correspond to some other logical grouping of light fixtures. Each one of the groups of the light fixtures 150 may include identities of light fixtures 150 that are in the respective group. For example, Group 1 may include Light (1, 1), Light (2, 1), and Light (3, 1).

The power device 160 may determine whether the computing device 180 is co-located with any of the light fixtures 150 by communicating over the wireless link 380. For example, the computing device 180 may transmit an identity of the user logged into the computing device 180 over the wireless link 380 to the sensor 370. Accordingly, the power device 160 may receive the identity of the user from one or more light adapters 140 electrically coupled to the sensor 370 or sensors that received the identity of the user over the wireless link 380.

Based on receipt of data, such as the identity of the user, over the wireless link 380, the power device 160 may determine that the computing device 180 is co-located with the sensor 370 and/or the one or more of the light fixtures 150 that are in a group of light fixtures electrically coupled to the sensor 370.

The computing device 180 may receive instructions from a user of the computing device 180 on how to control the light fixtures in the group of light fixtures. In one example, the application 360 may generate a slider control on a user interface that represents a dimmer control, where a position on the slider control indicates a target light level of the fixtures 150 in the group. In a second example, the application 360 may generate a user interface control that receives a timeout value. The timeout value may indicate an amount of time that may elapse after last detecting an occupant in a room before the light fixtures 150 are shut off.

The computing device 180 may transmit control instructions to the power device 160 over the data network 170, over the wireless link 380, or over any combination thereof. The control instructions may indicate how the light fixture or light fixtures 150 in the group are to be controlled as a group. For example, the control instructions may include an indication of the target light level of the light fixtures 150 in the group. In response to receipt of the control instructions, the power device 160 may control the light fixtures 150 in the group. For example, the power device 160 may set an output light level of the light fixtures 150 to match the target light level received from the computing device.

Alternatively or in addition, the computing device 180 may include user preferences, which the computing device 180 transmits in control instructions to the power device 160. The user preferences may include configuration settings. Alternatively or in addition, the power device 160 may store the preference settings for one or more users of computing devices in the memory 290 of the power device 160. The power device 160 may adjust power to, or otherwise control, the light fixtures 150 co-located with the computing device 180 to match the preference settings.

The groups of light fixtures may be formed during a commissioning process, such as is described in U.S. patent application Ser. No. 12/708,460, "METHODS OF COMMISSIONING LIGHTING SYSTEMS." During the commissioning process, a pointing device may be used to point at the light fixtures 150 and/or the sensors 120 in order to assign the light fixtures 150 to respective groups. Alternatively or in addition, the groups of light fixtures may be automatically formed by the power device 160 based on which of the light fixtures 150 are co-located with the computing device 180. Thus, the power device 160 may group the light fixtures 150 that the power device 160 determines are co-located with the computing device 180. The computing device 180 may transmit control instructions to the power device 160, which the power device 160 then applies to the automatically formed group of light fixtures 150. Therefore, if two computing devices are in a room, then a first group of the light fixtures 150 located nearest to the first computing device may be controlled by the first computing device, and a second group of the light fixtures 150 nearest to the second computing device may be controlled by the second computing device. The automatically formed groups may be formed as subgroups of the groups formed during commissioning. An automatically formed group may include light fixtures 150 from two or more groups formed during commissioning.

A building control system may include one or more fixtures controlled by one or more devices. A fixture may include a device that is attached or otherwise coupled to a physical structure. Examples of a fixture may include a light fixture, a control device, a wall switch, a dimmer switch, a dimmable window, a thermostat, a vent, a sensor, or any other device that may be coupled to a building. Examples of the building control system may include a lighting system, a heating system, a cooling system, and an HVAC (Heating, Ventilating, and Air Conditioning) system. Examples of one or more outputs of the building control system may include light, heat, and cooling.

In one or more examples, the wireless link 380 may be bi-directional. Alternatively, the wireless link 380 may be unidirectional from the computing device 180 to the lighting system. Alternatively, the wireless link 380 may be unidirectional from the lighting system to the computing device 180. For example, a signal source in the lighting system, such as the signal source 330 in the computing device 180, may emit a signal detectable by a sensor in the computing device 180. For example, the signal source in the lighting system may include one or more of the light fixtures 150. The power device 160 may modulate the light emitted by the light fixtures 150 in order to encode a fixture identifier 385 that identifies the respective light fixture 150. A camera or other sensor in the computing device 180 may detect the signal from the light fixtures 150 that are co-located with the computing device 180. The computing device 180 may decode the fixture identifier 385 or fixture identifiers.

The computing device 180 may communicate with the power device 160 over the data network 170 and provide the fixture identifier 385 or fixture identifiers as a basis on which the power device 160 may determine where the computing device 180 is physically. Alternatively or in addition, the fixture identifier 385 or some other code transmitted by the lighting system may be used in a handshaking process. Handshaking may be a process of establishing a connection between two endpoints on a communications network. The computing device 180 may attempt to establish a connection with the power device 160. In response, the power device 160 may direct one or more signal sources in the lighting system to transmit a code over the wireless link 380. In response to receiving the code over the wireless link 380, the computing device 180 may transmit the code to the power device 160 over the data network 170. When the power device 160 receives the code from the computing device 180, the power device may accept the connection requested by the computing device 180 over the data network 170, thereby completing the handshaking process.

The systems 100 and 200 described herein apply to building control systems in general, as well as to lighting systems specifically. For example, the application 360 may generate a user interface that accepts a target output level 387, such as a target temperature for an area or physical location co-located with the computing device 180. The application 360 may transmit a control instruction comprising an indication of the target output level 387 to the sensor 370 over the wireless link 380, where the sensor 370 is in the building control system. The power device 160 in the building control system may receive the indication of the target output level 387 from an adapter, such as the light adapter 140, that is coupled to the sensor 370. The power device 160 may determine what fixtures are co-located with the computing device 180. In one example, the fixtures that are electrically coupled to the light adapter 140 may be associated with the sensor 370 in the memory 290 of the power device 160 and be, therefore, co-located with the computing device 180. Alternatively or in addition, the power device 160 may determine that one or more fixtures are associated with the sensor 370 based on receipt, by the power device 160, of information from the sensor 370 over conductors that power the fixture. Accordingly, the power device 160 may adjust the temperature of the area or physical location that is co-located with the computing device 180. For example, the power device 160 may adjust a setting in a thermostat, louvers in a vent, or a combination thereof, so that the temperature of a physical area in which the computing device 180 is located matches the target output temperature.

In one or more examples, the features of the power device 160 described herein may be implemented in a control unit 390 that does not provide power to the load devices such as the light fixtures 150. The control unit 390 may include a processor and a memory, such as the processor 280 and the memory 290 in the power device 160. Alternatively or in addition, the features of the power device 160 may be implemented by nodes in a peer-to-peer system. For example, the adapters, such as the light adapters 140, may be nodes in the peer-to-peer system.

Figure 4:
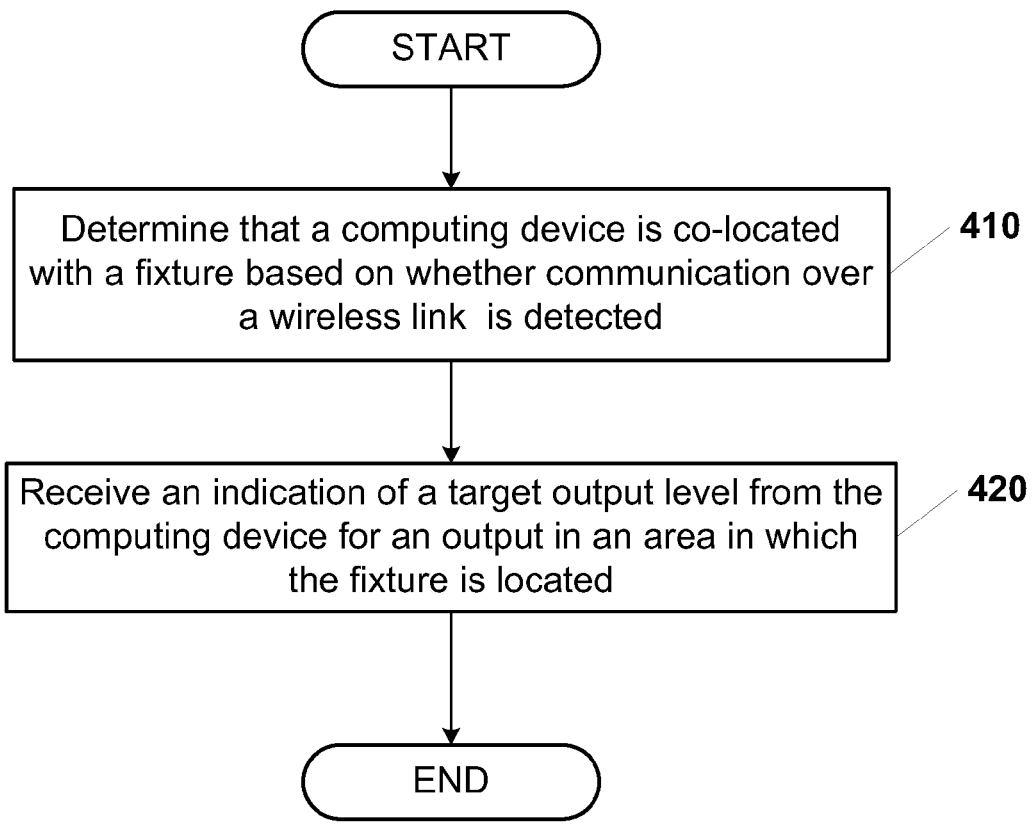
FIG. 4 is a flow diagram of example logic of a system for integrating a computing device with a building control system.

FIG. 4 is a flow diagram of example logic of the systems 100 and 200 for integrating the computing device 180 with the building control system. The logic may include fewer, additional, or different operations than illustrated in FIG. 4. The operations may be executed in a different order than illustrated in FIG. 4.

The operations may begin when a determination is made that the computing device 180 is co-located with the fixture based on whether communication over the wireless link 280 is detected (410). In one example, the control unit may determine that the computing device 180 is co-located with the fixture based on whether the sensor 370 detects a signal generated by the signal source 330 of the computing device 180. In another example, the control unit may determine that the computing device 180 is co-located with the fixture based on whether the control unit receives an indication over the data network 170 that a sensor in the computing device 180 detected a signal generated by a signal source included in the fixture.

The operations may continue when an indication of the target output level 387 is received from the computing device 180 (420). For example, the building control system may receive an indication of a target temperature from the computing device 180 over the data network 170. The operations may end when, for example, when the output of the building control system is adjusted to match the target output level 387 in the area in which the fixture is located.

The systems 100 and 200 may be implemented with additional, different, or fewer entities. As one example, the processor 280 may be implemented as a microprocessor, a microcontroller, a DSP, an application specific integrated circuit (ASIC), discrete logic, or a combination of other types of circuits or logic. As another example, the memory 290 may be a non-volatile and/or volatile memory, such as a random access memory (RAM), a read-only memory (ROM), an erasable programmable read-only memory (EPROM), flash memory, any other type of memory now known or later discovered, or any combination thereof. The memory 290 may include an optical, magnetic (hard-drive) or any other form of data storage device.

The processing capability of the systems 100 and 200 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable media, for example, secondary storage devices such as hard disks, floppy disks, and CD-ROMs; a signal received from a network; or other forms of ROM or RAM either currently known or later developed. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A lighting system comprising:
a light sensor configured to detect a visible light signal emitted by a display screen of a portable computing device, wherein a light fixture is associated with the light sensor; and
a control unit configured to set an output light level of the light fixture and to receive information from the display screen of the portable computing device via the light sensor, wherein the information is embedded in the visible light signal emitted by the display screen of the portable computing device by varying a frequency, intensity and/or color of the visible light signal emitted by the display screen of the portable computing device based on the information, and/or by varying a refresh rate of the display screen of the portable computing device based on the information, wherein the information is embedded in the visible light signal directly, by modulation and/or by coding.

2. The lighting system of claim 1, wherein the information from the display screen of the portable computing device comprises an indication of the output light level.

3. A non-transitory computer-readable medium encoded with computer executable instructions, the computer executable instructions executable with a processor in a portable computing device that includes a display screen that emits light, the computer-readable medium comprising:
instructions executable to communicate with a building control system over a visible light link from the display screen of the portable computing device to a light sensor in the building control system, wherein a determination that the portable computing device is in communication with the building control system over the visible light link between the display screen of the portable computing device and the light sensor indicates that the portable computing device is co-located with the light sensor; and
instructions executable to transmit a target output level of an output of the building control system from the display screen of the portable computing device to the building control system based on the determination that the portable computing device and the sensor are co-located, wherein the output of the building control system is in an area in which the portable computing device is located, and wherein the output of the building control system is generated or controlled by a fixture in the building control system,
wherein the instructions are configured to transmit the target output level of the output of the building control system from the display screen of the portable computing device to the building control system by varying a frequency, intensity and/or color of a visible light signal emitted by the display screen of the portable computing device based on the target output level, and/or by varying a refresh rate of the display screen of the portable computing device based on the target output level, wherein the target level is embedded in the visible light signal directly, by modulation and/or by coding.

4. The computer-readable medium of claim 3, wherein the fixture comprises a light fixture and the target output level is indicative of an output light level of the light fixture.

5. The computer-readable medium of claim 3, wherein the target output level comprises a target temperature for a physical area in which the fixture is located.

6. The computer-readable medium of claim 3 further comprising instructions executable to receive a fixture identifier over the visible light link at the portable computing device from the building control system, wherein the instructions executable to transmit the target output level further comprise instructions executable to transmit the fixture identifier and the target output level over a data network different from the visible light link.

7. The computer-readable medium of claim 3 further comprising instructions included in a screen saver application that is displayed on the display screen of the portable computing device, executable to transmit user activity information from the display screen of the portable computing device to the building control system during operation of the screen saver application.

8. A building control system comprising:
a sensor configured to detect a visible light signal emitted by a display screen of a portable computing device; and
a processor configured to determine that the sensor and the portable computing device are co-located based on a detection of the visible light signal by the sensor, the processor being further configured to receive an identity of the portable computing device from the computing device via the sensor in response to the sensor and the portable computing device being co-located, wherein the processor is configured to receive the identity of the portable computing device by detecting, via the sensor, variation in a frequency, intensity and/or color of the visible light signal emitted by the display screen of the portable computing device based on the identity of the portable computing device, and/or variation of a refresh rate of the display screen of the portable computing device based on the identity of the portable computing device, wherein the identity of the portable computing device is embedded in the visible light signal directly, by modulation and/or by coding.

9. The building control system of claim 8, wherein the processor is further configured to determine a physical location of the portable computing device from a location of the sensor based on the sensor and the portable computing device that are co-located.

10. The building control system of claim 8 further comprising a plurality of sensors configured to detect the visible light signal emitted by the display screen of the portable computing device, wherein the processor is further configure to track a location of the portable computing device based on a determination of which of the sensors the computing device is co-located with, in response to detection of the visible light signal emitted by the display screen of the portable computing device by at least one of the sensors.

11. The building control system of claim 10, wherein the processor is further configured to track a location of a user based on receipt by the processor of a user identifier in the visible light signal emitted by the display screen of the portable computing device, the user identifier indicating the user is logged into the portable computing device.

12. The building control system of claim 8 further comprising a plurality of sensors configured to detect the visible light signal emitted by the display screen of the portable computing device, wherein the sensor is a first one of the plurality of sensors, and the processor is further configured to determine that the computing device is co-located with the first one of the plurality of sensors based on the visible light signal emitted by the display screen of the portable computing device at the first one of the plurality of sensors being stronger than at another one of the plurality of sensors.

13. The building control system of claim 8, wherein a user preference is associated with the identity of the portable computing device, and the processor is further configured to set a light level in a lighting area illuminated by a light fixture based on the user preference.

14. The building control system of claim 13, wherein the processor is configured to determine the light fixture and the sensor are associated based on receipt, by the processor, of information from the sensor over conductors that power the light fixture.

15. A method for communicating with a building control system, the method comprising:
determining with a processor in the building control system that a portable computing device that includes a display screen that emits light is co-located with a fixture in the building control system based on whether communication over a visible light link between the display screen of the portable computing device and the building control system is detected; and
receiving a target output level from the display screen of the portable computing device at the processor based on the portable computing device being co-located with the fixture, the target output level being for an output of the building control system in an area in which the fixture is located, wherein the target output level is received from the display screen of the portable computing device by receiving a varying frequency, intensity and/or color of a visible light signal emitted by the display screen of the portable computing device based on the target output level, and/or by receiving a varying refresh rate of the display screen of the portable computing device based on the target output level, wherein the target level is embedded in the visible light signal directly, by modulation and/or by coding.

16. The method of claim 15 further comprising associating an identity of a user of the portable computing device with the fixture based on the portable computing device being co-located with the fixture.

17. The method of claim 15, wherein determining the fixture and the computing device are co-located comprises transmitting a code over the visible light link in a signal generated by a signal emitter associated with the fixture, the signal detectable with a sensor in the portable computing device, and receiving the code from the portable computing device over a data network at the processor.

18. The method of claim 15 further comprising determining a physical location of the fixture with the processor from data received by the processor from the portable computing device.

19. The method of claim 15 further comprising adjusting the output of the building control system based on the target output level in the area in which the fixture is located.

20. The method of claim 15 further comprising mapping the portable computing device to a group of fixtures closest to the portable computing device.

21. A portable computing device comprising:
a portable device display screen;
a portable device processor that is configured to display visible images on the portable device display screen;
the portable device processor being further configured to embed information in the visible images that are displayed on the portable device display screen such that the information is received by a light sensor that is associated with a lighting system and is used by the lighting system to control the lighting system in response to the information, by varying a frequency, intensity and/or color of the visible light signal emitted by the display screen of the portable computing device based on the information, and/or by varying a refresh rate of the display screen of the portable computing device based on the information, wherein the information is embedded in the visible light signal directly, by modulation and/or by coding.

22. The portable computing device of claim 21 wherein the information comprises an indication of a light level of the lighting system.

23. The portable computing device of claim 21 wherein the information comprises an identification of the portable computing device or a user thereof.

24. The portable computing device of claim 21 wherein the portable device processor is further configured to embed the information in the visible images that are displayed on the portable device display screen such that the information is not noticeable to a user of the portable computing device.

25. The portable computing device of claim 21 wherein the portable device processor is further configured to embed the information in the visible images that are displayed on the portable device display screen such that the information is received by a plurality of light sensors that are associated with the lighting system, including the light sensor, and is used by the lighting system to detect movement of the portable computing device and to control the lighting system in response to the movement of the portable computing device.

* * * * *